(12) United States Patent
Bikumandla et al.

(10) Patent No.: US 11,915,437 B1
(45) Date of Patent: Feb. 27, 2024

(54) SYSTEMS AND METHODS FOR A MULTI-SPECTRAL DEPTH CAMERA ASSEMBLY

(71) Applicant: META PLATFORMS TECHNOLOGIES, LLC, Menlo Park, CA (US)

(72) Inventors: Manoj Bikumandla, Union City, CA (US); Andrew Matthew Bardagjy, Fremont, CA (US); Cina Hazegh, Walnut Creek, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 534 days.

(21) Appl. No.: 15/813,608

(22) Filed: Nov. 15, 2017

(51) Int. Cl.
  *G06T 7/521* (2017.01)
  *G02B 27/42* (2006.01)
  *G02B 5/28* (2006.01)
  *G02B 27/01* (2006.01)

(52) U.S. Cl.
  CPC .......... *G06T 7/521* (2017.01); *G02B 27/0172* (2013.01); *G02B 27/425* (2013.01); *G02B 5/28* (2013.01); *G02B 2027/014* (2013.01); *G02B 2027/0127* (2013.01); *G02B 2027/0138* (2013.01)

(58) Field of Classification Search
  CPC .................................. G06T 7/521; G02B 5/28
  See application file for complete search history.

(56) References Cited

U.S. PATENT DOCUMENTS

| | | | |
|---|---|---|---|
| 6,790,387 B1* | 9/2004 | Ball | B21B 1/227 264/1.1 |
| 2003/0223083 A1* | 12/2003 | Geng | G01B 11/2509 356/603 |
| 2008/0069166 A1* | 3/2008 | Lee | H01S 5/18391 372/50.11 |
| 2014/0168380 A1* | 6/2014 | Heidemann | G01B 11/2518 348/47 |
| 2015/0317824 A1* | 11/2015 | Hayashi | G06T 5/002 348/79 |
| 2018/0061034 A1* | 3/2018 | Zhao | G01B 11/2513 |
| 2018/0184056 A1* | 6/2018 | Kawai | G01S 17/894 |

\* cited by examiner

*Primary Examiner* — Jayanti K Patel
*Assistant Examiner* — Christopher Kingsbury Glover
(74) *Attorney, Agent, or Firm* — Greenberg Traurig, LLP

(57) ABSTRACT

The disclosed depth camera assembly may include a projector device to project light into an imaging environment. The projector device may include a light source and may also include a diffractive optical element that separates light emitted by the light source into a plurality of light regions including a plurality of separate wavelength ranges, such that each of the plurality of light regions contain light from only one of the plurality of separate wavelength ranges. The projector device may also include an interference filter. A head-mounted display system and related methods are also disclosed.

18 Claims, 10 Drawing Sheets

SYSTEMS AND METHODS FOR A MULTI-SPECTRAL DEPTH CAMERA ASSEMBLY

BACKGROUND

Augmented reality and virtual reality systems often rely on an imaging device, such as a camera or a sensor, for depth sensing. A conventional depth sensing device in such systems may project light into an area and determine the depth of objects within the area based on light backscattered or reflected or from the objects after the light has been projected. However, background ambient light and/or light of specific wavelength bands (e.g., infrared light) may interfere with depth sensing device measurements. Additionally, the use of a single wavelength range for the projected light may be problematic depending on the surfaces or objects included in the local area. Thus, the instant disclosure identifies and addresses a need for improved apparatuses, systems, and methods for producing three-dimensional information describing a local environment and/or objects in that environment in augmented and virtual reality applications.

SUMMARY

As will be described in greater detail below, the instant disclosure describes a depth sensing device that includes a projector device that produces a patterned array that includes individual illuminated regions of a plurality of wavelength ranges and does so while utilizing a broadband illumination source. The depth sensing device, or depth camera apparatus, may include a filter that blocks some wavelength ranges and passes others and a diffractive optical element to separate and isolate the light of a first wavelength range from the light of a second wavelength range, so that these wavelength ranges can be separate within the patterned array.

In one example, a depth camera assembly may include a projector device to project light into an imaging environment. The projector device may include a light source. The projector device may also include a diffractive optical element that separates light emitted by the light source into a plurality of light regions including a plurality of separate wavelength ranges, such that each of the plurality of light regions contain light from only one of the plurality of separate wavelength ranges. The projector device may also include an interference filter. The interference filter and the diffractive optical element may be disposed over n emissive side of the light source.

Some exemplary implementations of the depth camera assembly may include one or more of the following features. The interference filter may be disposed between the diffractive optical element and the light source. The diffractive optical element may be disposed between the interference filter and the light source. The light source may be a broadband light source and the interference filter may block light that is outside the plurality of separate wavelength ranges. At least one of the plurality of separate wavelength ranges may be a visible wavelength range. The plurality of separate wavelength ranges may include a blue wavelength range, a green wavelength range, and a red wavelength range. The diffractive optical element may separate light into the plurality of light regions based on the plurality of separate wavelength ranges. The diffractive optical element may have a patterned surface that directs the plurality of separate wavelength ranges into the plurality of light regions. The plurality of light regions may include a patterned array. The light source may be a vertical-cavity surface-emitting laser. In addition, the depth camera assembly may further include an imaging device that receives reflected light from the plurality of light regions to determine three-dimensional characteristics of the imaging environment or of the depth camera assembly. Implementations of the described techniques may include hardware, a method or process, or computer software on a computer-accessible medium.

Some exemplary implementations of the depth camera assembly may further include a plurality of actuation mechanisms that may be coupled to the diffractive optical element and/or the interference filter to move the diffractive optical element and/or the interference filter relative to the light source. By controllably moving the diffractive optical element and/or the interference filter, the problem of limited resolution in multispectral imaging (due at least in part to the plurality of filters that are typically deposited on the imagers)can be mitigated. Even where the color resolution per pixel may be fixed, these actuation mechanisms may spatially vary the color at the source.

In another example, a system may include a head-mounted display (HMD) and a projector device to project light into an imaging environment. The system may include a light source. The system may also include a diffractive optical element that separates light emitted by the light source into a plurality of light regions including a plurality of separated wavelength ranges, with each of the plurality of light regions including light in only one of the plurality of separate wavelength ranges. The system may further include an interference filter. The interference filter and the diffractive optical element may be disposed over an emissive side of the light source.

Implementations of such a system may include one or more of the following features. The projector device may be coupled to at least one of the head-mounted display or an external sensor device. The head-mounted display may include a virtual reality headset and/or an augmented reality headset. The light source may be a broadband light source, and the interference filter may block light that is outside the plurality of separate wavelength ranges. At least one of the plurality of separate wavelength ranges may be a visible wavelength range. The diffractive optical element may include a diffraction grating. In addition, the system may include a printed circuit board, where the printed circuit board is electrically coupled to the projector device and to an imaging device that receives reflected light from the plurality of light regions to determine three-dimensional characteristics of the imaging environment or of the system Implementations of the described techniques may include hardware, a method or process, or computer software on a computer-accessible medium.

In one example, a method for generating and utilizing a patterned array may include projecting a plurality of light regions into an imaging environment from a projector device. The plurality of light regions may include a plurality of separate wavelength ranges, with each of the plurality of light regions including light of only one of the plurality of separate wavelength ranges. The plurality of separate wavelength ranges may be produced by a diffractive optical element and one or more interference filters included in the projector device. The method may further include receiving reflected light from the plurality of light regions with an imaging device and processing the reflected light from the plurality of light regions to determine three-dimensional characteristics of the imaging environment or of the imaging device itself.

Implementations may include one or more of the following features. The projector device may be disposed proximate to the imaging device in a head-mounted display of a headset. The interference filter may be disposed between the diffractive optical element and a light source of the projector device. The diffractive optical element may be disposed between the interference filter and the light source of the projector device.

Additionally, the above-described method may be encoded as computer-readable instructions on a computer-readable medium. For example, a computer-readable medium may include one or more computer-executable instructions that, when executed by at least one processor of a computing device, may cause the computing device to perform at least one of the steps of the method, such as processing the reflected light from the plurality of light regions to determine three-dimensional characteristics of the imaging environment or of the imaging device itself.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
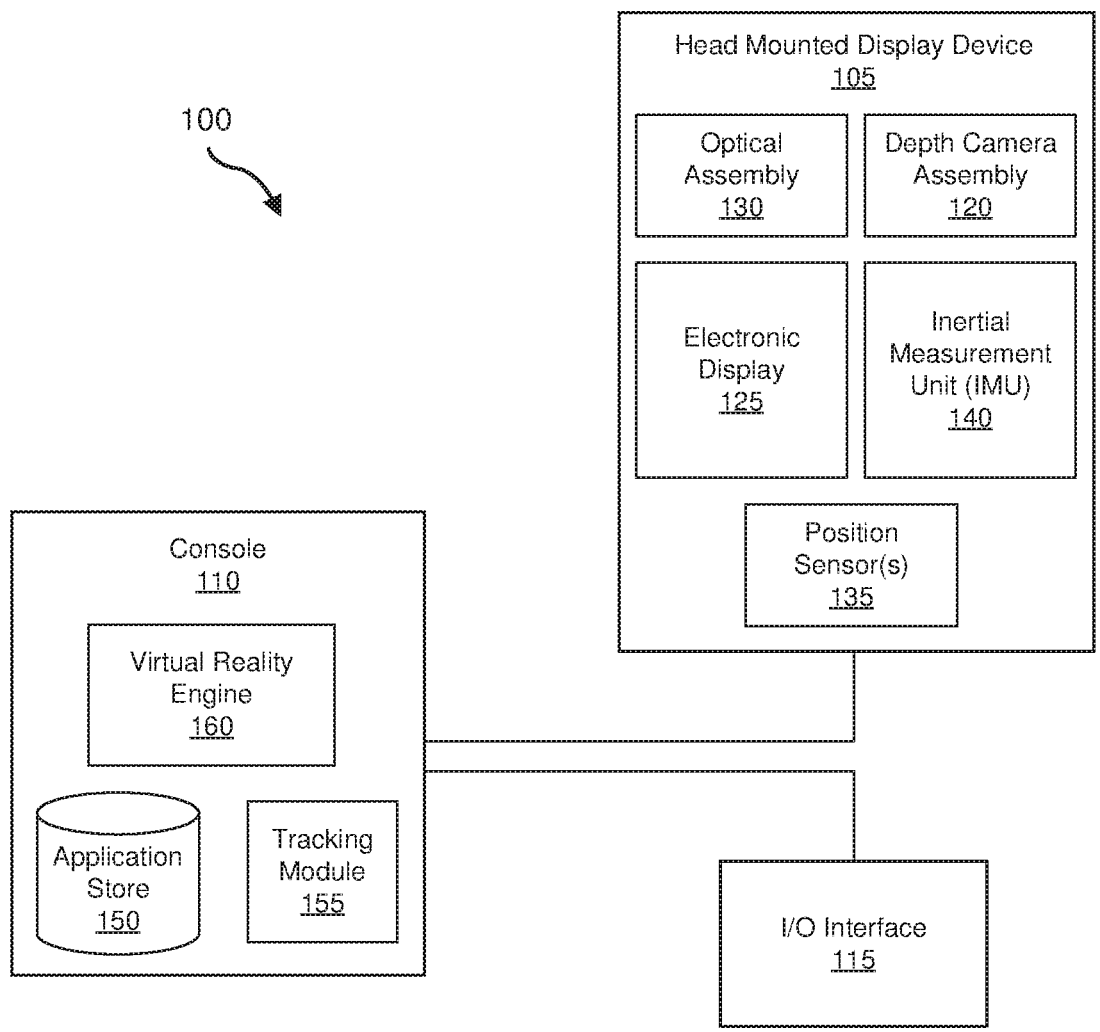
FIG. 1 is a block diagram of a head-mounted display system including a console, a head-mounted display, and an input/output (I/O) interface, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to an improved depth camera system or depth camera assembly that may be utilized in a head-mounted display system for virtual or augmented reality. However, the improved depth camera assembly and related methods may be utilized in contexts beyond display systems. As will be explained in greater detail below, embodiments of the instant disclosure may include a projector device that includes a broadband light source, a filter for selecting only a portion of emitted light, and a diffractive optical element to separate the portions of emitted light according to their separate wavelength ranges. A lens system included in the projector device may direct the separated wavelength ranges into a pattern that can be used to characterize a three-dimensional environment or the position, velocity, and acceleration of the depth camera assembly within such a three-dimensional environment.

The following will provide, with reference to FIGS. 1-9, detailed descriptions of exemplary artificial reality systems, imaging devices, headsets, and local area imaging assemblies that may incorporate aspects of a projector device according to exemplary embodiments of the present disclosure, and associated methods, that may be used to project and utilize separate wavelength ranges in a structure imaging scheme. The projector device and associated methods may also be applied to applications such as machine vision, surveying, and produce quality evaluation, etc.

FIG. 1 is a block diagram of one embodiment of an HMD system 100 in which a console 110 operates. The HMD system 100 may operate in a virtual reality (VR) system environment, an augmented reality (AR) system environment, a mixed reality (MR) system environment, or some combination thereof. The HMD system 100 shown in FIG. 1 may include an HMD 105 and an input/output (I/O) interface 115 that is coupled to the console 110.

While FIG. 1 shows an example HMD system 100 that includes at least one HMD 105 and at least one I/O interface 115, in other embodiments any number of these components may be included in the HMD system 100. For example, there may be multiple HMDs 105 each having an associated I/O interface 115, with each HMD 105 and I/O interface 115 communicating with the console 110. In alternative configurations, different and/or additional components may be included in the HMD system 100. Additionally, functionality described in conjunction with one or more of the components shown in FIG. 1 may be distributed among the components in a different manner than described in conjunction with FIG. 1 in some embodiments. For example, some or all of the functionality of the console 110 may be provided by the HMD 105.

The HMD 105 is a head-mounted display that presents content to a user including virtual views of an artificially rendered-world environment and/or augmented views of a physical, real-world environment, augmented with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 105, the console 110, or both, and presents audio data based on the audio information. In some embodiments, such speakers and/or headphones may be integrated into or releasably coupled or attached to the HMD 105. The HMD 105 may include one or more bodies, which may be rigidly or non-rigidly coupled together. A rigid coupling between rigid bodies may cause the coupled rigid bodies to act as a single rigid entity. In contrast, a non-rigid coupling between rigid bodies may allow the rigid bodies to move relative to each other. An embodiment of the HMD 105 is the HMD 200 shown in FIG. 2 and described in further detail below.

The HMD 105 may include a depth camera assembly (DCA) 120 (or depth camera system), an electronic display 125, an optical assembly 130 (also referred to as an optics block 130), one or more position sensors 135, and an inertial measurement unit (IMU) 140. Other embodiments of the HMD 105 may include an optional eye tracking system configured to track the eyes of a user of the HMD 105, an optional varifocal module configured to be configured to adjust focus of one or more images displayed on the electronic display 125 based on the determined eye tracking information obtained from the eye tracking system, and other components. Some embodiments of the HMD 105 have different components than those described in conjunction with FIG. 1. Additionally, the functionality provided by various components described in conjunction with FIG. 1 may be differently distributed among the components of the HMD 105 in other embodiments.

The DCA 120 may capture data describing depth information characterizing a local area surrounding some or all of the HMD 105 and/or characterizing a position, velocity, or position of the DCA 120 (and thereby of the HMD 105) within the local area. The DCA 120 can compute the depth information using collected data (e.g., based on a captured light according to one or more computer-vision schemes or algorithms, by processing a portion of a structured light pattern, by time-of-flight (ToF) imaging, simultaneous localization and mapping (SLAM), etc.) or the DCA 120 can transmit this data to another device such as the console 110 that can determine the depth information using the data from the DCA 120. To enable or augment such computer-vision schemes, the DCA 120 may include a projector device, described herein in greater detail. Additionally, embodiments of the DCA 120 are included in FIGS. 4 and 7, which are described in further detail below.

The electronic display 125 may display two-dimensional or three-dimensional images to the user in accordance with data received from the console 110. In various embodiments, the electronic display 125 includes a single electronic display or multiple electronic displays (e.g., a display for each eye of a user). Examples of the electronic display 125 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof. In some embodiments, the electronic display 125 may represent the electronic display 306 in FIG. 3.

The optical assembly 130 may magnify image light received from the electronic display 125, correct optical errors associated with the image light, and present the corrected image light to a user of the HMD 105. The optical assembly 130 may include a plurality of optical elements. Example optical elements included in the optical assembly 130 include: an aperture, a Fresnel lens, a convex lens, a concave lens, a filter, a reflecting surface, or any other suitable optical element that affects image light. Moreover, the optical assembly 130 may include combinations of different optical elements. In some embodiments, one or more of the optical elements in the optical assembly 130 may have one or more coatings, such as partially reflective or anti-reflective coatings. In some embodiments, the optical assembly 130, or one or more components thereof, may be integrated into the electronic display 125.

The IMU 140 may, in some examples, represent an electronic device that generates data indicating a position of the HMD 105 based on measurement signals received from one or more of the position sensors 135 and from depth information received from the DCA 120. For example, a position sensor 135 may generate one or more measurement signals in response to motion of the HMD 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 may generate data indicating an estimated current position and/or orientation of the HMD 105 relative to an initial position and/or orientation of the HMD 105. For example, the position sensors 135 may include multiple accelerometers to measure translational motion (forward/back, up/down, left/right) and multiple gyroscopes to measure rotational motion (e.g., pitch, yaw, roll).

The I/O interface 115 may represent a device that allows a user to send action requests and receive responses from the console 110. An action request may, in some examples, represent a request to perform a particular action. For example, an action request may be an instruction to start or end capture of image or video data or an instruction to perform a particular action within an application. The I/O interface 115 may include one or more input devices. Example input devices include: a keyboard, a mouse, a hand-held controller, or any other suitable device for receiving action requests and communicating the action requests to the console 110. An action request received by the I/O interface 115 may be communicated to the console 110, which may perform an action corresponding to the action request. In some embodiments, the I/O interface 115 includes an IMU 140 that captures calibration data indicating an estimated position of the I/O interface 115 relative to an initial position of the I/O interface 115. In some embodiments, the I/O interface 115 may provide haptic feedback to the user in accordance with instructions received from the console 110 and/or the HMD 105. For example, haptic feedback is provided when an action request is received, or the console 110 communicates instructions to the I/O interface 115 causing the I/O interface 115 to generate haptic feedback when the console 110 performs an action.

The console 110 may provide content to the HMD 105 for processing in accordance with information received from one or more of: the DCA 120, the HMD 105, and the I/O interface 115. In the example shown in FIG. 1, the console 110 includes an engine 160, application store 150, and a tracking module 155. Some embodiments of the console 110 have different modules or components than those described in conjunction with FIG. 1. Similarly, the functions further described below may be distributed among components of the console 110 in a different manner than described in conjunction with FIG. 1.

The application store 150 may store one or more applications for execution by the console 110. An application may, in some examples, represent a group of instructions, that when executed by a processor, generates content for presentation to the user. Content generated by an application may be in response to inputs received from the user via movement of the HMD 105 or the I/O interface 115. Examples of applications include: gaming applications, conferencing applications, video playback applications, or other suitable applications.

The tracking module 155 may calibrate the HMD system 100 using one or more calibration parameters and may adjust one or more calibration parameters to reduce error in determination of the position of the HMD 105 or of the I/O interface 115. For example, the tracking module 155 may communicate a calibration parameter to the DCA 120 to adjust the focus of the DCA 120 to more accurately determine positions of structured light elements captured by the DCA 120. Calibration performed by the tracking module 155 may also account for information received from the IMU 140 in the HMD 105 and/or an IMU 140 included in the I/O interface 115. Additionally, if tracking of the HMD 105 is lost (e.g., the DCA 120 loses line of sight of at least a threshold number of structured light elements), the tracking module 155 may recalibrate some or all of the HMD system 100.

The tracking module 155 may track movements of the HMD 105 or of the I/O interface 115 using information from the DCA 120, the one or more position sensors 135, the IMU 140, or some combination thereof. For example, the tracking module 155 determines a position of a reference point of the HMD 105 in a mapping of a local area based on information from the HMD 105. The tracking module 155 may also determine positions of the reference point of the HMD 105 or a reference point of the I/O interface 115 using data indicating a position of the HMD 105 from the IMU 140 or sing data indicating a position of the I/O interface 115 from an IMU 140 included in the I/O interface 115, respectively. Additionally, in some embodiments, the tracking module 155 may use portions of data indicating a position and/or orientation or the HMD 105 from the IMU 140 as well as representations of the local area from the DCA 120 to predict a future location of the HMD 105. The tracking module 155 may provide the estimated or predicted future position of the HMD 105 or the I/O interface 115 to the engine 160.

The engine 160 may generate a three-dimensional mapping of the area surrounding some or all of the HMD 105 (i.e., the "local area") based on information received from the HMD 105. In some embodiments, the engine 160 determines depth information for the three-dimensional mapping of the local area based on information received from the DCA 120 that is relevant for techniques used in computing depth. The engine 160 may calculate depth information using one or more techniques in computing depth from structured light. In various embodiments, the engine 160 uses the depth information to, e.g., update a model of the local area, and generate content based in part on the updated model.

The engine 160 may also execute applications within the HMD system 100 and receive position information, acceleration information, velocity information, predicted future positions, or some combination thereof, of the HMD 105 from the tracking module 155. Based on the received information, the engine 160 may determine content to provide to the HMD 105 for presentation to the user. For example, if the received information indicates that the user has looked to the left, the engine 160 generates content for the HMD 105 that corresponds to the user's movement in a virtual environment or in an environment augmenting the local area with additional content. Additionally, the engine 160 may perform an action within an application executing on the console 110 in response to an action request received from the I/O interface 115 and provide feedback to the user that the action was performed. The provided feedback may be visual or audible feedback via the HMD 105 or haptic feedback via the I/O interface 115.

In some embodiments, based on the eye tracking information (e.g., orientation of the user's eye) received from the eye tracking system, the engine 160 determines resolution of the content provided to the HMD 105 for presentation to the user on the electronic display 125. The engine 160 may provide the content to the HMD 105 having a maximum pixel resolution on the electronic display 125 in a foveal region of the user's gaze, whereas the engine 160 may provide a lower pixel resolution in other regions of the electronic display 125, thus achieving less power consumption at the HMD 105 and saving computing cycles of the console 110 without compromising a visual experience of the user. In some embodiments, the engine 160 can further use the eye tracking information to adjust where objects are displayed on the electronic display 125 to prevent vergence-accommodation conflict.

Figure 2:
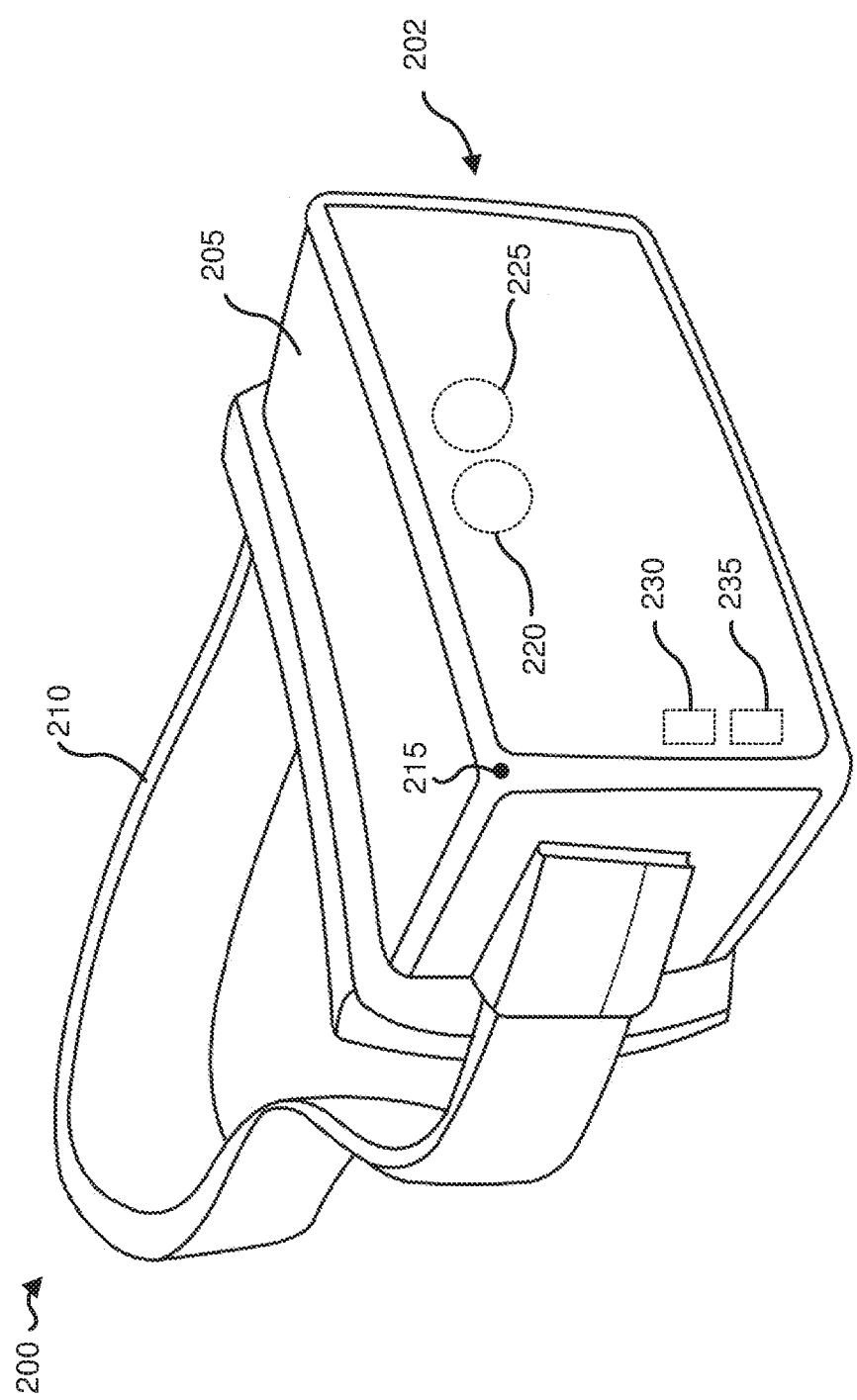
FIG. 2 is a diagram of an exemplary HMD of FIG. 1, according to an embodiment.

FIG. 2 is a diagram of an HMD 200, in accordance with one embodiment. The HMD 200 may include the imaging device and a depth camera assembly. The HMD 200 may be part of, e.g., a VR system, an AR system, an MR system, or some combination thereof. In embodiments that describe an AR system and/or an MR system, portions of a front side 202 of the HMD 200 are at least partially transparent in the visible band (about 380 nanometers (nm) to 750 nm), and portions of the HMD 200 that are between the front side 202 of the HMD 200 and an eye of the user are at least partially transparent (e.g., a partially transparent electronic display). The HMD 200 may include a front rigid body 205, a band 210, and a reference point 215. The HMD 200 may also include a DCA with the imaging device 320 configured to determine depth information of a local area surrounding sore or all of the HMD 200. In addition, the HMD 200 may include an imaging aperture 220 and an illumination aperture 225, and an illumination source of the DCA may emit light (e.g., structured light) through the illumination aperture 225. The imaging device of the DCA may capture light from the illumination source that is reflected or backscattered from the local area through the imaging aperture 220.

The front rigid body 205 may include one or more electronic display elements, one or more integrated eye tracking systems, an IMU 230, one or more position sensors 235, and the reference point 215. In the embodiment shown by FIG. 2, the position sensors 235 are located within the NU 230, and neither the IMU 230 nor the position sensors 235 are visible to a user of the HMD 200. The IMU 230 may represent an electronic device that generates fast calibration data based on measurement signals received from one or more of the position sensors 235. A position sensor 235 may generate one or more measurement signals in response to motion of the HMD 200. Examples of position sensors 235 include: one or more accelerometers, one or more gyroscopes, one or more magnetometers, another suitable type of sensor that detects motion, a type of sensor used for error correction of the IMU 230, or some combination thereof.

The position sensors 235 may be located external to the IMU 230, internal to the IMU 230, or some combination thereof.

Figure 3:
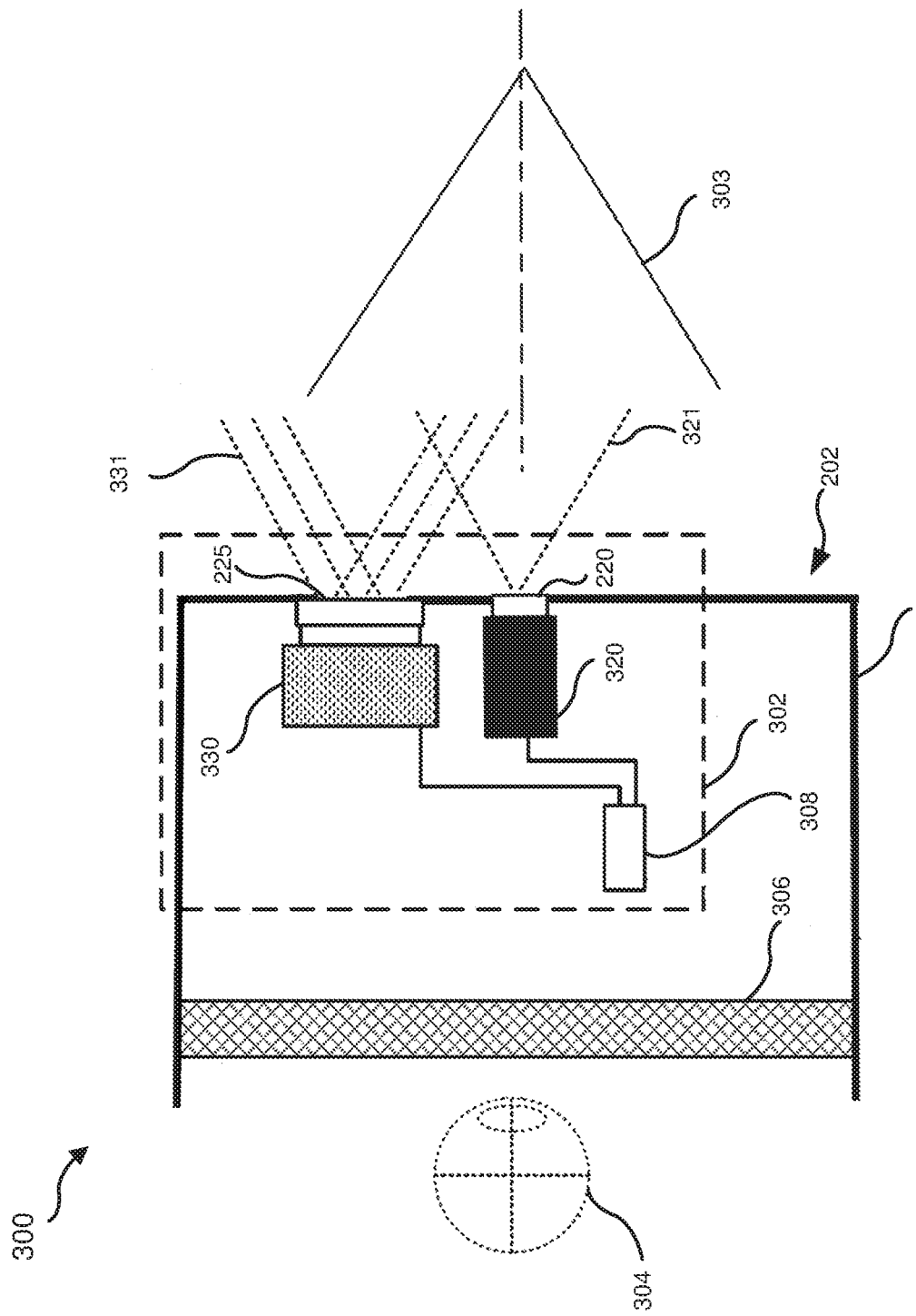
FIG. 3 is a cross-sectional diagram of a front rigid body of the HMD of FIG. 2, according to some embodiments.

FIG. 3 represents a cross section of front rigid body 205 of the HMD 200 of FIG. 2. As shown in FIG. 3, the HMD 200 may include a local area imaging assembly 302. In some examples, a local area imaging assembly 302 (which may be an embodiment of the DCA 120 of FIG. 1) is configured to capture image data that is utilized in determining, mapping, and/or tracking position, orientation, and/or movement of objects within an area, such as local environment or area 303 (e.g., an area in front of or surrounding the HMD 200). In some examples, local area imaging assembly 302 may include an imaging device 320 and a projector device 330 configured to emit light (i.e., a carrier signal) into local area 303.

In some embodiments, local area imaging assembly 302 may determine depth and/or surface information for objects within local area 303 in a variety of ways. For example, local area imaging assembly 302 may be utilized in a SLAM tracking system to identify and/or map features of local area 303 and/or to identify a location, orientation, and/or movement of the HMD 200 and/or other objects (e.g., hand-held controllers, users, etc.) in local area 303. In some examples, the projector device 330 may emit light 331 as a structured light pattern (e.g., a symmetric and/or quasi-random dot pattern, a grid pattern, horizontal bars, etc.) into local area 303. In these examples, local area imaging assembly 302 may determine the depth and/or surface information based on triangulation or perceived deformation of the emitted pattern. In one embodiment, local area imaging assembly 302 may capture ToF information describing the time required for light emitted from the illumination source of the projector device 330 to be reflected from one or more objects in local area 303 back to imaging device 320, which collects reflected light 321. In this embodiment, local area imaging assembly 302 may determine a distance between local area imaging assembly 302 and the objects in the local area 303 based on the ToF information. In some embodiments, the local area imaging assembly may collect other information for other applications, including machine vision, surveying, produce quality evaluation, etc.

In some examples, information collected by local area imaging assembly 302 may be used as part of an image and/or video (e.g., an artificial reality image and/or video) displayed to a user earing the HMD 200. In one example, shown in FIG. 3, the image and/or video may be displayed to a user (e.g., via an eye 304 of the user) via an electronic display 306. Electronic display 306, which may be an embodiment of the electronic display 125 of FIG. 1, may represent a single electronic display or multiple electronic displays (e.g., a display for each eye of a user). Examples of electronic display 306 may include, without limitation, an LCD display, an ©LED display, an ILED display, an AMO-LED display, a TOLED display, a projector, a cathode ray tube, an optical mixer, and/or some combination thereof. The local area imaging assembly 302 may also include an imaging controller 308, which may be an image processor that is coupled to the projector device 330 and/or imaging device 320.

Figure 4:
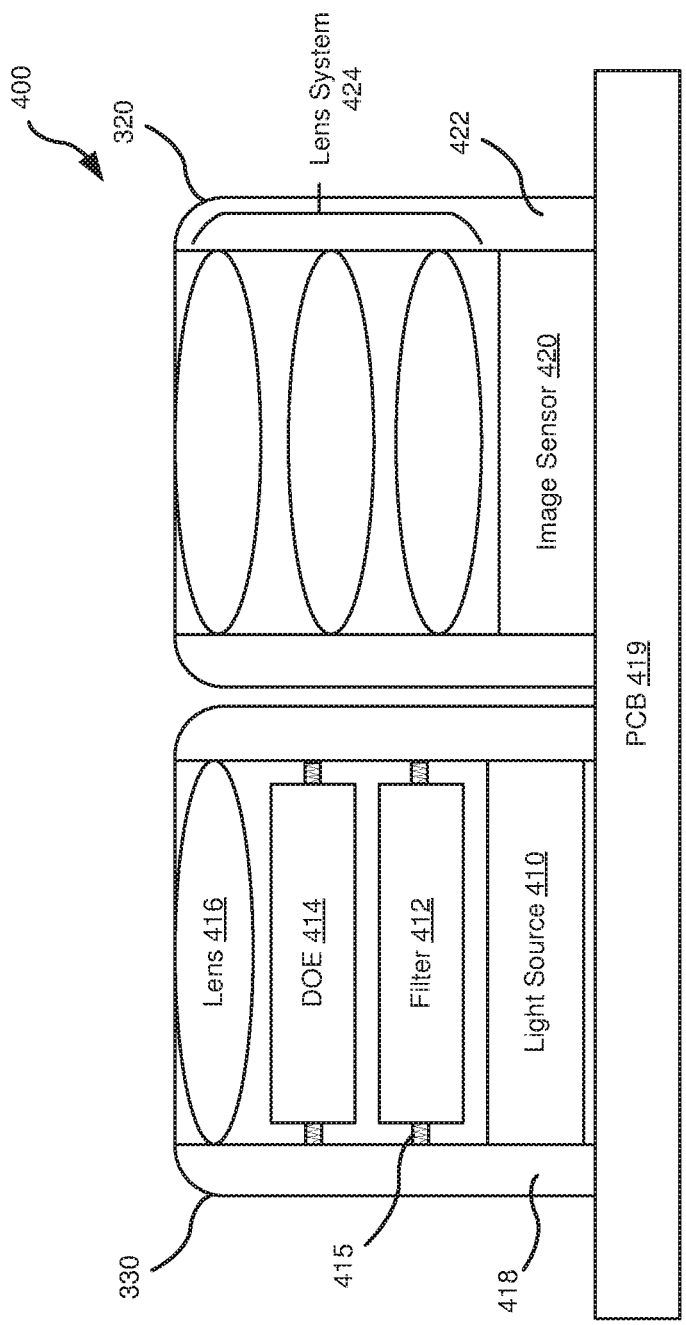
FIG. 4 is a cross-sectional diagram of a depth camera assembly that may be used with the HMD system of FIG. 1, according to some embodiments.

Referring now to FIG. 4, shown therein is a DCA 400, which may be an embodiment of the local area imaging assembly 302 of FIG. 3 and the DCA 120 of FIG. 1. While some embodiments of the DCA 400, and other DCA described herein, are depicted as integrated into the HMD 200, other embodiments may include stand-alone DCAs or DCAs integrated into systems other than HMDs. As shown in FIG. 3, the front id body 205 may further include the local area imaging assembly 302, at least in part, for determining depth information of one or more objects in a local area 303 surrounding some or all of the HMD 200. The DCA 400 of FIG. 4 may include the imaging device 320 and the projector device 330 shown in FIG. 3. The projector device 300 of the DCA 400 may further include a light generator 410, and a controller that may be coupled to both the light generator 410 and the imaging device 320. The light source 410 may emit light through an optics path and through the illumination aperture 225 of FIGS. 2 and 3. In accordance with some embodiments of the present disclosure, the light source 410 is configured to illuminate the local area 303 with light 331 in accordance with emission instructions generated by the controller, such as the controller 308 of FIG. 3.

The light source 410 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. Depending on the direction of emission by the light source 410, the light source 410 may include a mirror and/or other optical elements to redirect the generated light toward the local area 303. In some embodiments, a single emitter or a plurality of emitters in the light source 410 can emit one or more light beams. In the depicted embodiment of FIG. 4, the light source 410 may be a broadband light source, such that it emits light in an extended wavelength range. For example, the light source 410 may emit light in a wavelength range of about 300 nm to about 1000 nm, or in a range of about 400 nm to about 800 nm. Accordingly, the light source 410 may emit more than, all of, or a portion of the visible light spectrum.

The projector device 330 may further include a filter 412, which may be an interference filter or a dichroic filter, that passes two or more wavelength ranges of light, which block the rest of the wavelengths in the broadband light emitted by the light source 410. In some embodiments, the filter 412 passes two wavelength ranges included in the emitted light from the light source 410. However, other embodiments of the filter 412 may pass three or more wavelength ranges. The wavelength ranges passed through the filter 412 may have the same or different widths. For example, a filter may pass three wavelength ranges, centered at 440 nm, 550 nm, and 700 nm. The wavelength ranges may include 1 nm, 3 nm, 5 nm, 10 nm, or 20 nm, such that approximately half the range is on either side of the center of the wavelength range. The filter 412 may be a multispectral filter. The filter 412 may have a grid or array of mosaiced or tiled color filter portions, such that a first portion passes a first wavelength range of line, while a second portion passes a second wavelength range of light.

Figure 5:
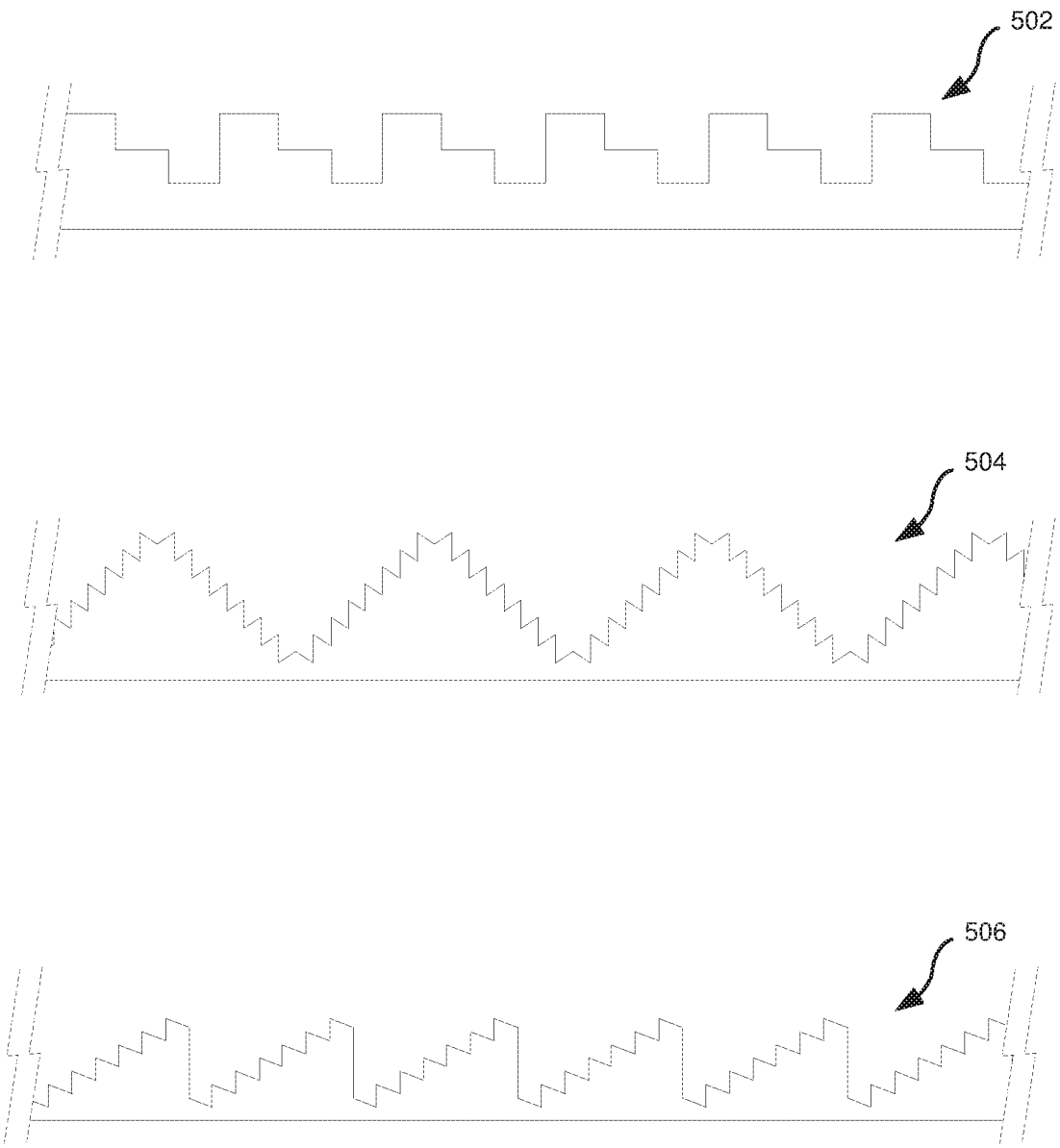
FIG. 5 shows cross-sectional views of exemplary diffractive optic elements that may be used in the depth camera assembly of FIG. 4, according to some embodiments.

The projector device 330 may also include a diffractive optical element (DOE) 414 such as a diffraction grating or a similar structure made from optical glass or acrylic. Examples of the DOE 414 are shown in FIG. 5. FIG. 5 includes three exemplary diffractive optical elements shown in partial cross-section. The first DOE 502 includes a horizontal step pattern. The steps have a top surface parallel to a bottom surface of the DOE 502. The width of the steps may be the same or different, and the height difference between adjacent steps may also be the same or different. The horizontal step pattern of the DOE 502 may be same across the entire structure or may have regions that are different, e.g., including a different step pattern. The second DOE 504 includes a series of pyramidal structures having steps on either side. The steps are angled with respect to the bottom surface of the DOE 504. The angles may be in a range from about 15 degrees to about 75 degrees and may be uniform or non-uniform, such that some of the steps may have different angled top surfaces. The third DOE 506 includes a structure with a plurality of steps (angled as shown, but parallel to the bottom surface of the DOE 506 in other embodiments), that ascend to a highest step and then drop (rather than gradually descend, as in DOE 504) to the lowest step in the pattern. In some embodiments, the depicted cross-sections of the DOEs 502, 504, and 506 extend the full length of the DOE 414. Other embodiments may include different cross-sectional configurations, such that the pattern varies in the x- and y-directions of the top surface of the DOE 414. In other embodiments, the DOE 414 may be provided by diffraction gratings having different spacing and may be used to separate the filtered wavelength ranges.

FIG. 4 further depicts actuation mechanisms, such as the exemplary actuation mechanism 415, that couple the DOE 414 and the filter 412 to the housing 418. The actuation mechanism 415 may be a MEMS actuator, a voice coil motor, or any other suitable actuation mechanism that can controllably move the DOE 414 and the filter 412 within the plane parallel to the lens 416. While the DOE 414 and the filter 412 are depicted as being individually actuatable, in some embodiments the DOE 414 and the filter 412 may be fixed in relation to each other and moved jointly. By moving the DOE 414 and the filter 412, an enhanced patterned may be projected into the local area 303, as described in more detail herein.

The projector device 330 may further include a lens 416 (which may be one or more lenses) that further directs the emitted light, after filtering by the filter 412 and separation by the DOE 414, to be distributed across at least a portion of the local environment 303 of FIG. 3. In some embodiments of FIG. 4, the lens 416, the DOE 414, and the filter 412 may be combined into a single package or module. As shown, the lens 416, the DOE 414, the filter 412, and the light source 410 may be combined into a single module housing 418, which may be formed from an opaque plastic material or other suitable material. The housing 418 of the projector device 330 may include electrical leads on a bottom side that can be electrically coupled to a substrate, like the depicted printed circuit board (PCB) 419. Within the housing 418, the lens 416, the DOE 414, the filter 412, and the light source 410 may be coupled together using an applied adhesive, such as an ultraviolet-curing adhesive, by chip-to-chip bonding techniques, or by any other suitable approach. In some embodiments, the filter 412 may be integrated with the light source 410, such that these components form a single module that is then packaged along with the DOE 414 and lens 416 into the housing 418.

The DCA 400 may further include the imaging device 320 to capture, through the imaging aperture 220 of FIG. 2, at least a portion of the light 321 reflected from the local area 303. The imaging device 320 may capture one or more images of one or more objects in the local area 303 illuminated with the light 331 from the projector device 320. As described herein, the controller 308 coupled to the imaging device 320 may also be configured to determine depth information for the one or more objects based on the captured portion of the reflected light. In some embodiments, the controller 308 provides the determined depth information to a console (like the console 110 of FIG. 1) and/or an appropriate module or processing device included in the HMD 200. The console 110 and/or the HMD 200 may utilize the depth information to, e.g., generate content for presentation on the electronic display 306.

As shown in FIG. 4, the imaging device 320 may include an image sensor 420, which may be a complementary metal-oxide semiconductor (CMOS) image sensor, a charge-coupled device (CCD) image sensor, or any other suitable sensor that is capable of receiving light and encoding information from the received light in digital signals. The image sensor 420 may be included in an image sensor module, package, or housing 422 along with one or more lenses. Lens system 424 is shown above the image sensor 420 to, in some examples, adjust and focus the received light 331 onto the photosensitive components (diodes, transistors, resistors) of the image sensor 420. The lens system 424 is shown as including three lenses, but may include more or fewer lenses in other embodiments. Additionally, the lens system 424 may include additional optical components such as an infrared (IR) filter or other wavelength filter(s), an anti-reflective coating, etc.

Figure 6:
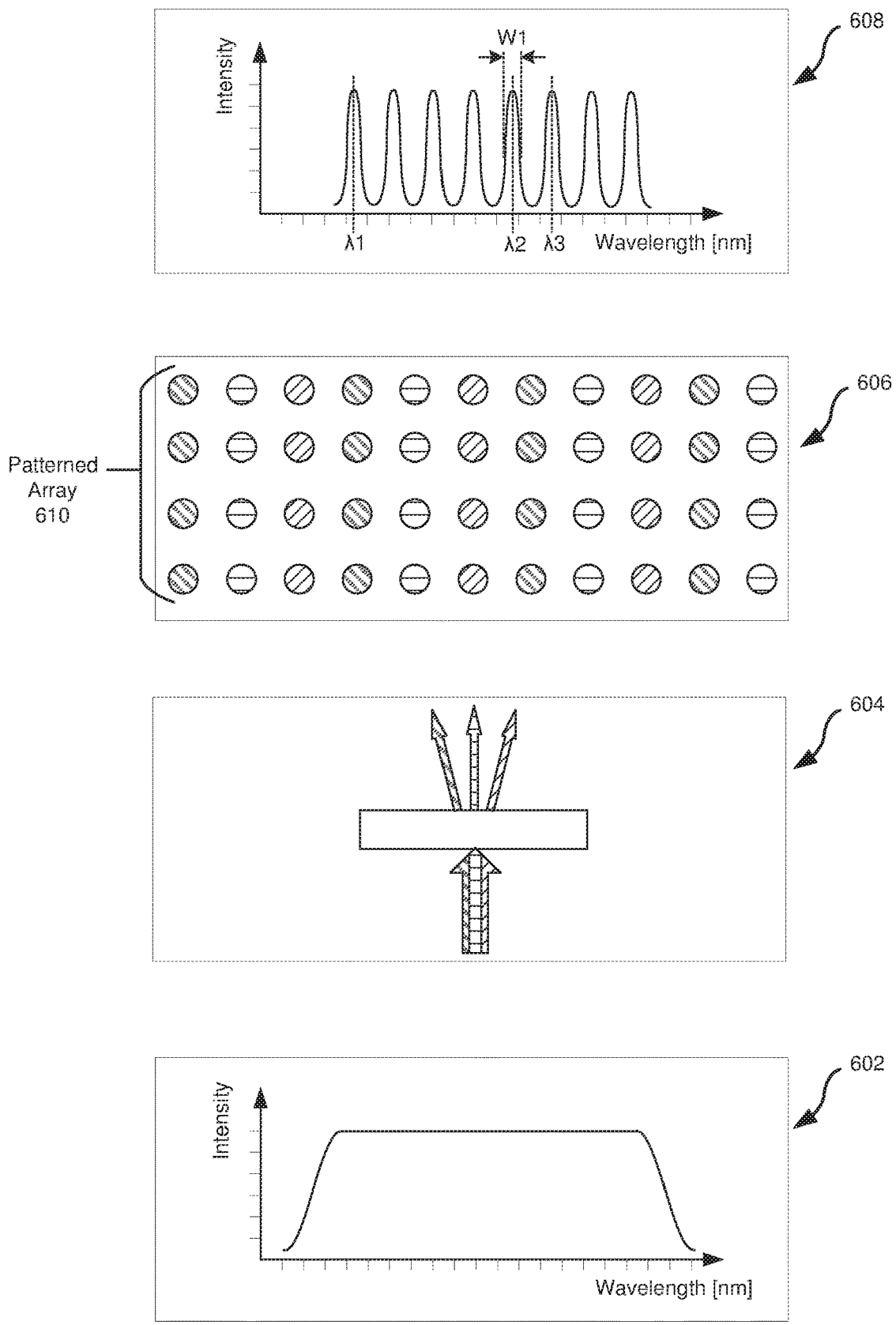
FIG. 6 is a flow diagram showing stages in the projection of a structured light pattern, according to some embodiments.

FIG. 6 is a flow diagram showing stages in the projection of a structured light pattern, according to some embodiments of the DCA 400 of FIG. 4. At the stage shown in window 602, broadband light is emitted by the broadband light source 410 of FIG. 4. An exemplary spectrum of the emitted light is shown that relates the intensity of emitted light to the wavelength of the emitted light. As shown, the intensity is a relative value, but may be measured in lumens or other units in some embodiments. As noted herein, the broadband light emitted by the light source 410 may have a wavelength range of about 300 nm to about 1000 nm, or in a range of about 400 nm to about 800 nm.

At the stage shown in the window 604, the effects of the filter 412 and the DOE 414 are shown. The filter 412 may pass some wavelength ranges of light while blocking others. As shown, the light passed by the interference filter 412 may include three wavelength ranges (or more or fewer in other embodiments), which may be defined by the depicted peaks $\lambda 1$, $\lambda 2$, and $\lambda 3$, at specific wavelengths, as shown in window 608. Each wavelength range may be further defined by a width. For example, the wavelength range associated with the peak may include a width W1, which may be about 3 nm, 5, nm, 10 nm, 25 nm, 50 nm, etc., according to the specifications of the filter 412. Each of the peaks $\lambda 1$, $\lambda 2$, and $\lambda 3$ has an associated width. Although three wavelength ranges are illustrated, other embodiments of the filter 412 may provide for more or fewer wavelength ranges. The wavelength ranges may be equally distributed, i.e., the peaks $\lambda 1$ and $\lambda 2$ are separated by the same distance as the peaks $\lambda 2$ and $\lambda 3$, or the wavelength ranges may be unequally distributed.

The DOE 414 may separate the filtered wavelength ranges such that the light associated with a first wavelength range is isolated from the light associated with the second wavelength range. In other embodiments, the DOE 414 may direct filtered light into a patterned array that includes illuminated features with multiple wavelength ranges. In some embodiments, multiple DOEs may be used in stages to separate/isolate the wavelength ranges included in the filtered light transmitted by the filter 412.

At the stage shown in window 606, the filtered, separated light (depicted as including features of three colors of light) are projected from the projector device 330 through the lens 416 thereof, as shown in FIG. 4. The lens 416 may further distribute the filtered, separated light into a two-dimensional pattern or patterned array 610 (shown in window 606), which then illuminates portions of the local area 303 of FIG. 3. As the patterned array is projected into the local area 303, the illuminated regions may take on aspects of the three-dimensional characteristics of the local area 303. For example, as the patterned array 610 is projected into the local area 303, some illuminated regions (shown as dots or circles of a particular wavelength range of light with each hatching pattern representing a single wavelength range) may be incident on a wall, a car, a couch, a person, etc., all of which are disposed within and make up the local area 303.

A portion of the incident light may reflect back to the imaging device 320 as reflected light 321, where it is encoded by the image sensor 420. These encoded signals characterizing the three-dimensional characteristics of the local area 303 may then be processed by an imaging processing system, such as the controller 308 or the console 110, to identify aspects of the scene of the local area 303. Accordingly, the encoded signals may be used to generate a three-dimensional model of the local area 303 and/or of one or more objects in the local area 303 as they move. Additionally or alternatively, the DCA 400 may move relative to the local area 303. For example, a user may be wearing the HMD 105 while navigating within the local area 303. The encoded signals may be used to generate a three-dimensional model of the HMD 105 and/or the user wearing the HMD 105 to determine the position, orientation, velocity, etc., of the HMD 105 and/or the user. As another example, the DCA 400 may be included on a robot or vehicle that is to navigate either with user control or without user control, within the local area 303.

Figure 7:
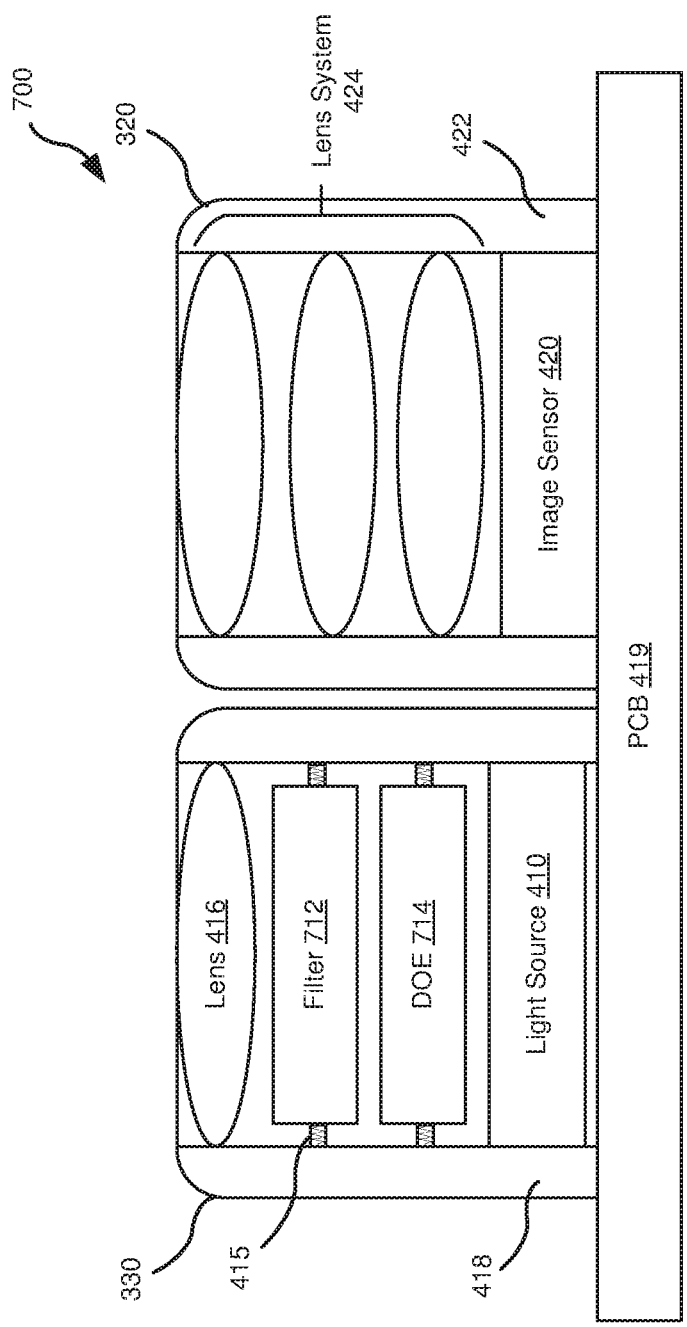
FIG. 7 is a cross-sectional diagram of another depth camera assembly that may be used with the HMD system of FIG. 1, according to some embodiments.

FIG. 7 is a cross-sectional diagram of another DCA 700 that may be used with the HMD system of FIG. 1, according to some embodiments. The DCA 700 may be similar to the DCA 400 of FIG. 4 in many respects. For example, the DCA 700 may include the projector device 330 and the imaging device 320, both electrically and physically coupled to the PCB 419. The imaging device 320 may include the imaging sensor 420 and a lens system 424 disposed within a housing 422. The imaging device 330 of FIG. 7 may include the light source 410 and the lens 416, as in the DCA 400 of FIG. 4. However, the projector device 330 may include a DOE 714 disposed over the light source 410, with a dichroic or interference filter 712 disposed over the DOE 714 and the light source 410. The interference filter 712 may be similar to the filter 412 as described herein. As depicted, both the filter 712 and the DOE 714 may be secured to the housing 418 by actuation mechanisms 415. The actuation mechanisms 415 may permit the filter 712 and 714 to be controllably moved, individually or jointly, in one or both of x- and y-directions, relative to the light source 410. Because of this different configuration, the optical path provided by the projector device 330 as shown in FIG. 7 may be different than that provided by the device 330 of FIG. 4.

Figure 8:
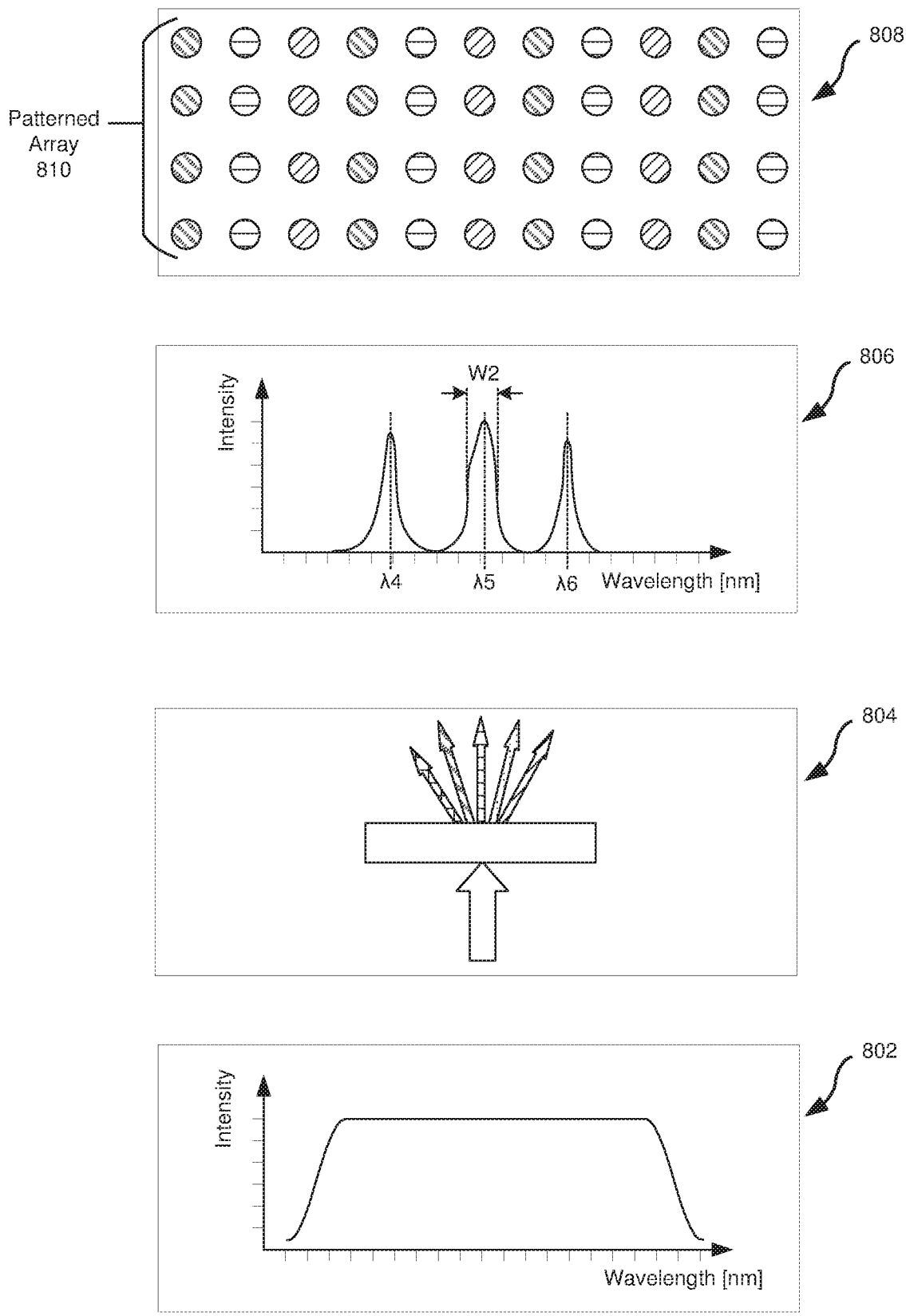
FIG. 8 is a flow diagram showing stages in the projection of a structured light pattern using the exemplary depth camera assembly of FIG. 7, according to some embodiments.

FIG. 8 is a flow diagram showing stages in the projection of a structured light pattern using the exemplary depth camera assembly of FIG. 7, according to some embodiments. In other words, FIG. 8 shows the optical path provided by the projector device of FIG. 7. FIG. 8 includes a plurality of windows corresponding to stages in the optical path of the DCA 700. As in FIG. 6, the light source of FIG. 7 may represent a broadband light source having a relatively high intensity across a broad wavelength range as shown in window 802. The broad wavelength range may be a portion of, the same as, or greater than the visible spectrum. This broadband light may first encounter the DOE 714, where the surfaces of the DOE 714 may induce diffraction in the broadband light to separate and redirect certain wavelength ranges. Some exemplary DOEs are shown in FIG. 6. As an example, the window 804 includes five depicted wavelength ranges produced by the interactions of the broadband light with the DOE 714. After the light is separated and at least partially redirected by the DOE 714, the separated light may be filtered by the interference filter 712. As shown in window 806, the filter 712 provides for further selection and isolation of the light received from the DOE 714. Accordingly, at least one embodiment of the filter 712 may permit three wavelength ranges to be passed through the body of the filter 712. As shown, the filter 712 may pass three wavelength ranges, centered about peaks $\lambda 4$, $\lambda 5$, and $\lambda 6$, which have widths like the exemplary width W2 associated with the peak $\lambda 5$. As shown in window 808, the broadband light emitted by the light source 410 may be manipulated to produce a patterned array 810 that can be projected into a local area, like the local area 303 of FIG. 3 to enable the collection of three-dimensional characteristics of the local area 303 and/or of the DCA 700 itself, which is positioned within the local area 303.

Figure 9:
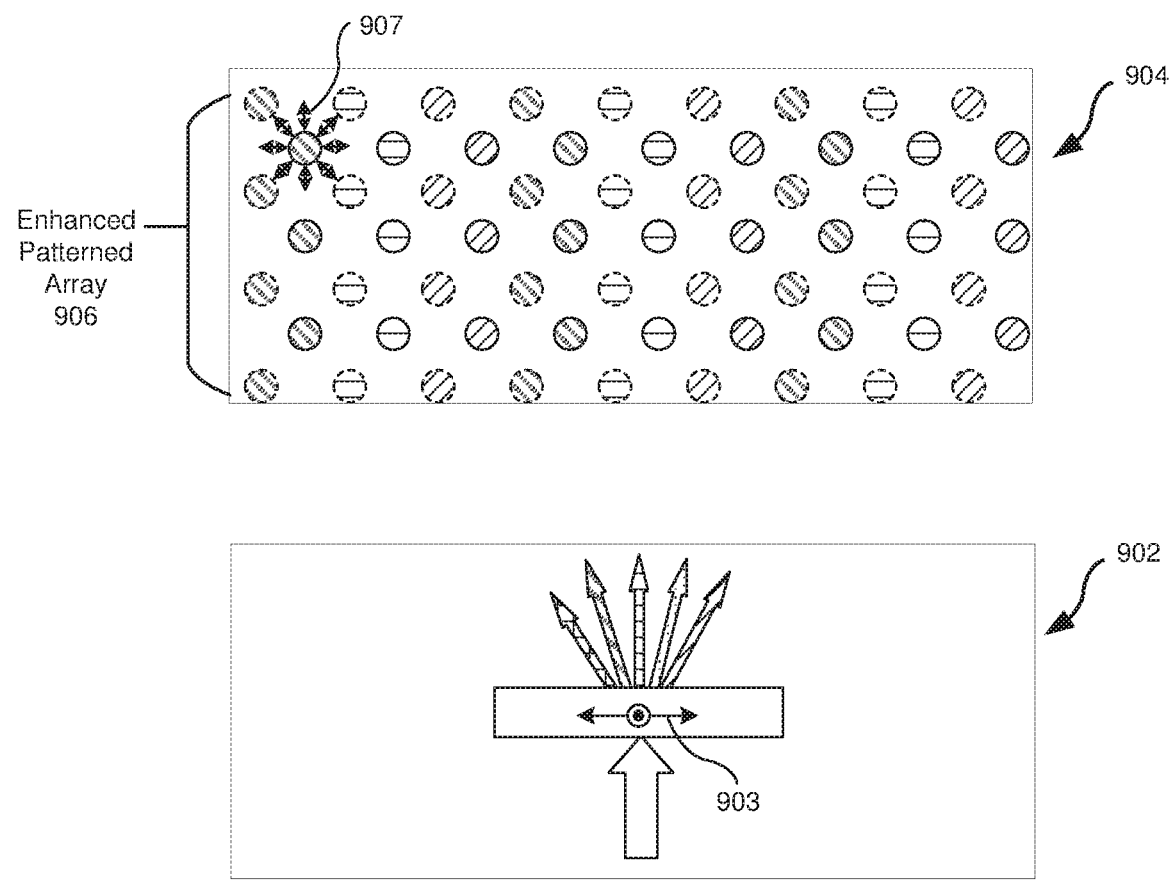
FIG. 9 is a flow diagram showing stages in the projection of an enhanced structured light pattern, according to some embodiments.

FIG. 9 is a flow diagram showing stages in the projection of an enhanced structured light pattern, according to some embodiments. As described herein, some embodiments of the projector device 330 may include actuation mechanisms that permit the filter 412 or 712 and the DOE 414 or 714 to move, together or separately, in the x- and y-directions or parallel to the lens 416. As shown in the window 902, a DOE, such as the DOE 414 or 714, receives light (broadband light or filtered light). As the DOE is moved in the x- and/or y-directions as shown by arrows 903, the projector device 330 generates an enhanced patterned array 906, shown in window 904. The enhanced pattern array 906 may be projected into the local area 303. Light reflected from the local area 303 may be received by the image sensor 420 and processed to determine depth information characterizing the local area 303 and objects therein.

The enhanced patterned array 906 may be different from the patterned arrays 810 or 610 shown in FIGS. 8 and 6, respectively. The enhanced patterned array 906 may be produced by shifting a single pattern from one time to another. For example, the features of the enhanced patterned array 906 shown as having a solid outline may be projected at a first time, while the features shown as having a dashed outline may be projected at a second time. The first time and the second time may be less than, for example, 1 ms, 10 ms, 100 ms, in some embodiments. The DOE may also be moved, by actuation of the actuation mechanisms 415, between two or more positions in a cyclical manner. For example, the DOE may be actuated to effectively provide a shift between portions of the enhanced patterned array 906, as shown by arrow 907.

In some embodiments, the enhanced patterned array 906 may be produced by movement of the filter in the projector device 330, such that the illuminated portions stay the same, but the wavelength ranges of the light included in the patterned array are changed. By cycling between the filter positions, the enhanced patterned array 906 may include illumination portions with multiple wavelengths included in each feature. In some embodiments, the enhanced patterned array 906 is produced by shifting both the DOE, or multiple DOEs, and the filter, such that the enhanced patterned array includes multiple illumination patterns with multiple wavelength ranges in each pattern. By utilizing an enhanced patterned array 906, more data points (corresponding to the features of the enhanced patterned array 906) can be generated for structured light imagers to read from the environment. Similarly, the production of more data points of different wavelengths can improve the resolution of hyperspectral imagers.

Figure 10:
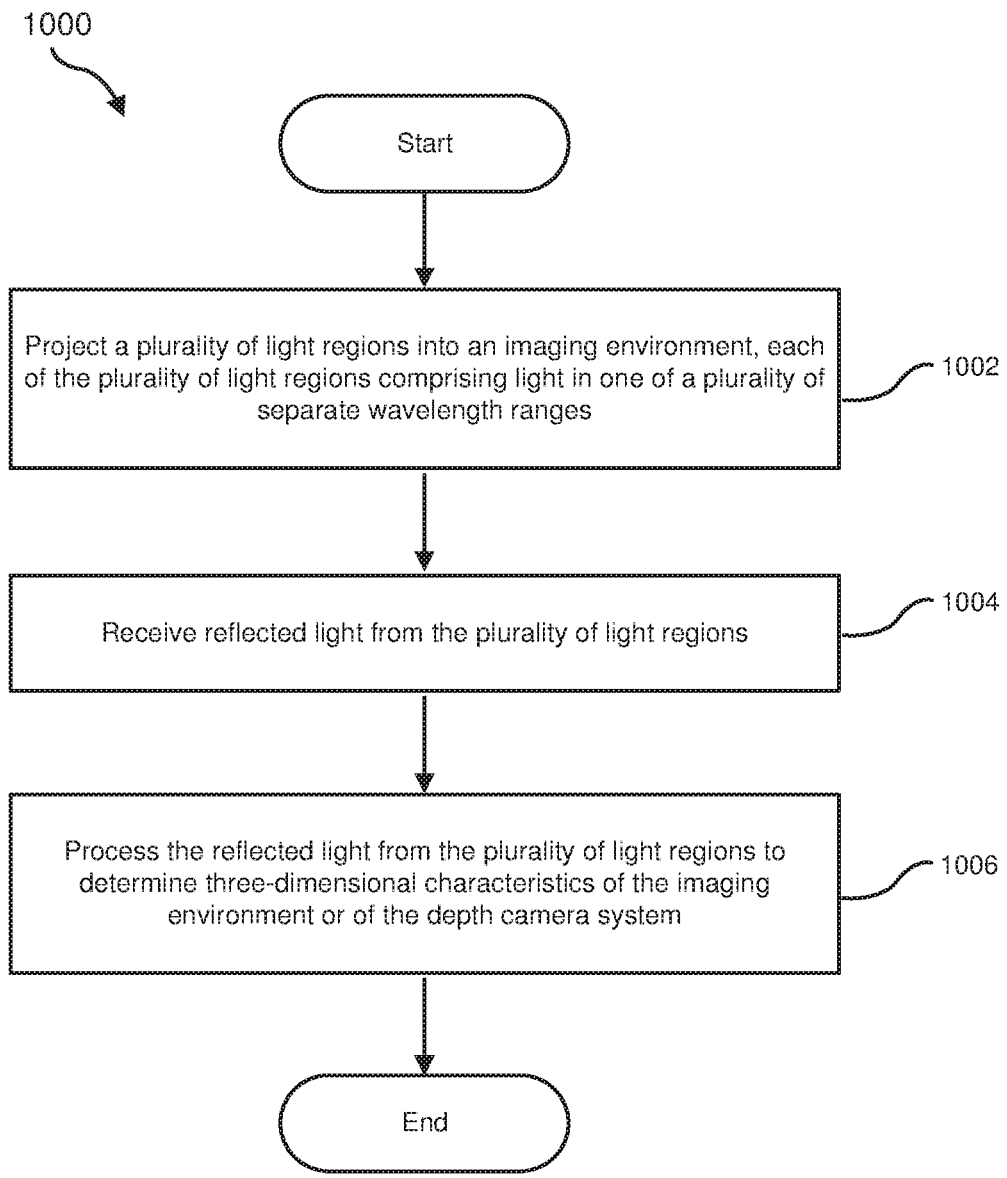
FIG. 10 is a flowchart of a method for producing and using a structured light pattern as shown in FIGS. 5, 8, and 9, according to some embodiments.

FIG. 10 is a flowchart of a computer-implemented method for producing and using a structured light pattern as shown in FIGS. 5 and 8, according to some embodiments, to determine three-dimensional characteristics of a local area and/or a device located within that local area. The steps shown in FIG. 10 may be performed by any suitable computer-executable code and/or computing system, including the system(s) illustrated in FIG. 1. In one example, each of the steps shown in FIG. 10 may represent an algorithm whose structure includes and/or is represented by multiple sub-steps, examples of which will be provided in greater detail below. The steps of the method 1000 may be performed using a depth camera assembly, like the depth camera assembly described herein and shown in FIGS. 1, 3, 4, and/or 7.

As illustrated in FIG. 10, at step 1002 one or more of the systems described herein may project, with a projector device, a plurality of light regions into an imaging environment, where (1) the plurality of light regions include a plurality of separate wavelength ranges, (2) each of the plurality of light regions include light in one of the plurality of separate wavelength ranges, and (3) the plurality of separate wavelength ranges are produced by a diffractive optical element included in the projector device. For example, the projector device 330 may be used to project a plurality of light regions. The plurality of light regions may form a patterned array, like patterned arrays 610 and 810 of FIGS. 6 and 8, respectively. Accordingly, the patterned array may include multiple colors or wavelength ranges of light, such as red, green, and blue. In some embodiments, the colors may include non-visible colors or wavelengths such as one or more discrete infrared wavelength ranges. As such, some of the light regions may be visible to the human eye while other light regions are not.

At step 1004, the method may further include receiving, by an imaging device, reflected light from the plurality of light regions. For example, the projector device 330 may project the emitted light 331 into the local area 303, as shown in FIG. 3, and the imaging device 320 may receive the reflected light 321. This reflected light 321 may include light from the patterned array. The imaging device may be part of a larger system, such as a depth camera assembly, like local area imaging assembly 302, which includes a controller. The controller may be a processing device or may be in communication with a processing device that operates as an image processor.

At step 1006, the method 1000 may further include processing, by a processing device, the reflected light from the plurality of light regions to determine three-dimensional characteristics of the imaging environment or of the depth camera assembly. For example, the reflected light 321 may be received by the imaging device 320 to generate corresponding electronic signals that include three-dimensional information. The reflected light 321 may be processed by the controller 308 or another onboard image processor included in the HMD 200, according to one or more computer-vision algorithms. Alternatively or additionally, the electronic signals may be processed by the console 110. The processing of the electronic signals derived from the reflected light may be used to generate a three-dimensional model of the local area 303 and/or a three-dimensional model of one or more objects present in the local area 303. Alternatively or additionally, the electronic signals proceeded by the image sensor 420 of the imaging device 320 may be processed to extract three-dimensional information characterizing a position and orientation of the imaging device 320 itself relative to the local area 303. The position and orientation information may be further processed to characterize movement of the imaging device 320, the HMD 200, and/or the user wearing the HMD 200, when the local area imaging assembly 302 is included in an HMD 200.

As detailed above, embodiments of the present disclosure may enable localization of a device or user within an environment and mapping of the environment. The use of the filter and DOE within the projector device may provide for a compact, reliable mechanism for generating such three-dimensional information. In addition, a broadband light source may be utilized with the filter and DOE to generate a patterned array that includes multiple, discrete wavelength ranges so that color may be used as an additional factor in the computer-vision scheme, providing a more robust solution.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive electronic signals from an image sensor to be transformed, transform the electronic signals, output a result of the transformation to generate three-dimensional information characterizing an environment or an object within that environment, use the result of the transformation to generate one or more models of the environment of an object in the environment, and store the generated models to enable and improve depth sensing and depth sensing applications as well as other applications in machine vision, surveying, and produce quality evaluation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A depth camera assembly comprising:
    a projector device to project light into an imaging environment external to the projector device, the projector device including:
    a broadband light source that emits light having wavelengths within a range of from about 400 nm to about 800 nm;
    a diffractive optical element that separates light emitted by the broadband light source into a plurality of light regions comprising a plurality of separate wavelength ranges, each of the plurality of light regions comprising a portion of the emitted light having wavelengths within one of the plurality of separate wavelength ranges and isolated from other portions of the emitted light having wavelengths within other separate wavelength ranges of the plurality of separate wavelength ranges; and
    an interference filter that passes light having wavelengths within each of the plurality of separate wavelength ranges and blocks light having wavelengths outside the plurality of separate wavelength ranges and wavelengths between two or more of the plurality of separate wavelength ranges; wherein the interference filter and the diffractive optical element are disposed over an emissive side of the broadband light source.

2. The depth camera assembly of claim 1, wherein the interference filter is disposed between the diffractive optical element and the broadband light source.

3. The depth camera assembly of claim 1, wherein the diffractive optical element is disposed between the interference filter and the broadband light source.

4. The depth camera assembly of claim 1, wherein at least one of the plurality of separate wavelength ranges is a visible wavelength range.

5. The depth camera assembly of claim 1, further comprising a plurality of actuation mechanisms coupled to at least one of the diffractive optical element and the interference filter to move the at least one of the diffractive optical element and the interference filter relative to the broadband light source.

6. The depth camera assembly of claim 1, wherein the diffractive optical element separates light into the plurality of light regions based on the plurality of separate wavelength ranges.

7. The depth camera assembly of claim 1, wherein the diffractive optical element has a patterned surface that directs the portions of the emitted light within the plurality of separate wavelength ranges into the plurality of light regions.

8. The depth camera assembly of claim 1, wherein the plurality of light regions comprises a patterned array.

9. The depth camera assembly of claim 1, wherein the broadband light source is a vertical-cavity surface-emitting laser.

10. The depth camera assembly of claim 1, further comprising an imaging device that receives reflected light from the plurality of light regions to determine three-dimensional characteristics of the imaging environment or of the depth camera assembly.

11. A system comprising:
a head-mounted display; and
a projector device to project light into an imaging environment external to the projector device, the projector device comprising: a broadband light source that emits light having wavelengths within a range of from about 400 nm to about 800 nm;
a diffractive optical element that separates light emitted by the broadband light source into a plurality of light regions comprising a plurality of separate wavelength ranges, each of the plurality of light regions comprising a portion of the emitted light having wavelengths within one of the plurality of separate wavelength ranges and isolated from other portions of the emitted light having wavelengths within other separate wavelength ranges of the plurality of separate wavelength ranges; and
an interference filter that passes light having wavelengths within each of the plurality of separate wavelength ranges and blocks light having wavelengths outside the plurality of separate wavelength ranges and wavelengths between two or more of the plurality of separate wavelength ranges, wherein the interference filter and the diffractive optical element are disposed over an emissive side of the broadband light source.

12. The system of claim 11, wherein the projector device is coupled to at least one of: the head-mounted display; or an external sensor device.

13. The system of claim 11, wherein the head-mounted display comprises at least one of: a virtual reality headset; or an augmented reality headset.

14. The system of claim 11, wherein at least one of the plurality of separate wavelength ranges is a visible wavelength range.

15. The system of claim 11, wherein the diffractive optical element comprises a diffraction grating.

16. The system of claim 11, further comprising a printed circuit board, wherein the printed circuit board is electrically coupled to the projector device and to an imaging device that receives reflected light from the plurality of light regions to determine three-dimensional characteristics of the imaging environment or of the system.

17. A method comprising:
emitting, from a broadband light source, light having wavelengths within a range of from about 400 nm to about 800 nm;
projecting, with a projector device, a plurality of light regions into an imaging environment external to the projector device, the plurality of light regions comprising a plurality of separate wavelength ranges, each of the plurality of light regions comprising a portion of emitted light having wavelengths within one of the plurality of separate wavelength ranges and isolated from other portions of the emitted light having wavelengths within other separate wavelength ranges of the plurality of separate wavelength ranges, wherein the plurality of separate wavelength ranges is produced by a diffractive optical element that is included in the projector device and that separates the light emitted from the broadband light source into the plurality of light regions;
wherein the emitted light is incident on an interference filter that:
passes light having wavelengths within each of the plurality of separate wavelength ranges; and
blocks light having wavelengths outside the plurality of separate wavelength ranges and wavelengths between two or more of the plurality of separate wavelength ranges;
receiving, by an imaging device, reflected light from the plurality of light regions; and
processing, by a processing device, the reflected light from the plurality of light regions to determine three-dimensional characteristics of the imaging environment or of the imaging device.

18. The method of claim 17, wherein the projector device is disposed proximate to the imaging device in a head-mounted display of a headset.

* * * * *